(12) United States Patent
Liao et al.

(10) Patent No.: US 11,580,153 B1
(45) Date of Patent: Feb. 14, 2023

(54) LOOKALIKE EXPANSION OF SOURCE-BASED CUSTOM AUDIENCE BY AN ONLINE SYSTEM

(71) Applicant: Meta Platforms, Inc., Menlo Park, CA (US)

(72) Inventors: Jason Jiawei Liao, Mountain View, CA (US); Divakar D. Balasubramanian, Saratoga, CA (US); Ryan Patrick Batterman, Salinas, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 706 days.

(21) Appl. No.: 16/037,589

(22) Filed: Jul. 17, 2018

(51) Int. Cl.
*G06F 16/43* (2019.01)
*G06F 16/435* (2019.01)
*G06Q 30/0251* (2023.01)
*G06F 16/951* (2019.01)

(52) U.S. Cl.
CPC .......... *G06F 16/437* (2019.01); *G06F 16/951* (2019.01); *G06Q 30/0271* (2013.01)

(58) Field of Classification Search
CPC .. G06F 16/437; G06F 16/951; G06Q 30/0271
See application file for complete search history.

(56) References Cited

U.S. PATENT DOCUMENTS

| | | | | |
|---|---|---|---|---|
| 8,645,317 B1* | 2/2014 | Klimetschek | ......... | G06F 16/958 707/609 |
| 10,521,824 B1* | 12/2019 | Boshy | ................ | G06Q 30/0269 |
| 2010/0223105 A1* | 9/2010 | Gassewitz | .......... | G06Q 30/0201 705/7.29 |
| 2010/0228623 A1* | 9/2010 | Devaraj | ................. | G06Q 30/02 705/14.45 |
| 2016/0210321 A1* | 7/2016 | Gong | ...................... | H04L 67/30 |
| 2016/0232575 A1* | 8/2016 | Kirti | ................. | G06Q 30/0275 |
| 2016/0275092 A1* | 9/2016 | Black | .................... | G06F 3/0484 |
| 2017/0140283 A1* | 5/2017 | Cheng | .................... | G06N 20/00 |
| 2018/0285730 A1* | 10/2018 | Zhao | ...................... | G06N 5/022 |
| 2018/0336598 A1* | 11/2018 | Gross-Baser | ...... | G06Q 30/0269 |

* cited by examiner

*Primary Examiner* — Alford W Kindred
*Assistant Examiner* — Tiffany Thuy Bui
(74) *Attorney, Agent, or Firm* — Fenwick & West LLP (57) ABSTRACT

An online system generates a cluster group and uses membership in the cluster group as an eligibility criteria for presenting a content item. The online system receives a request from a third party system to present the content item. The online system also receives identification information about users who have visited webpages associated with the third party system and descriptive information associated with the webpages. Based on the descriptive information, the online system extracts tags for the webpages and classifies the webpages into one or more categories that include a category associated with the content item. The online system generates a seed group that includes users who visited webpages in the category associated with the content item. The online system further expands the seed group to a cluster group by applying a cluster model to one or more characteristics of each candidate user not included in the seed group.

20 Claims, 5 Drawing Sheets

FIG. 6

# LOOKALIKE EXPANSION OF SOURCE-BASED CUSTOM AUDIENCE BY AN ONLINE SYSTEM

BACKGROUND

This disclosure relates generally to online content delivery and, in particular, to generating an audience for online content by lookalike expansion of a source-based seed group that defines custom audience for the online content.

Online systems have become increasingly prevalent in digital content distribution and consumption, and allow users to more easily communicate with one another. Users of an online system associate with other online system users, forming a web of connections. Additionally, users may share personal information and other stories with other users connected to them via an online system. Examples of information shared by online system users include videos, music, contact information, background information, job information, interests, photos, notes, and/or other member-specific data.

An online system stores content items, such as video files, audio files, pictures, documents, etc., for presenting to users of the online system. These content items can be created by the online system, uploaded by online system users, or received from third parties. Online system users may interact with content items presented to them in various ways. For example, an online system user may play, express preference, comment on, share, hide or leave videos presented to them. An online system user can also decide what content item to share with other users connected to the user at the online system, e.g., through a newsfeed of the user.

In many cases, for both sponsored and non-sponsored (i.e., organic) content, content providers who upload content to the online system for sharing with others may define the audience for that content. The audience definition may be a hard filter that defines which users are eligible to view the content, or it may simply indicate to the online system which users are preferred (e.g., so that the online system may target those users with suggestions to view the content). For example, an owner of a brand that has a presence on the online system may upload a video about the brand and further define as an audience for that video any users who have interacted with the brand in the online system. Then, the online system selects users to whom to deliver that video using, at least in part, that audience definition to determine which users are eligible to be presented with the video. Other common ways to define a target audience include demographic information about users, location or other contextual information about users, and information about users' social connections.

It is in the interest of content providers to present their content to a large audience. However, delivering content to users for whom the content was not intended is wasteful of users' time, limited screen space, and computing resources. Therefore, it is important to precisely target at online users who are particularly intended for the content. Despite the many existing ways to define an audience for content, there is a need for improved methods to enable content providers to deliver their content to a large but well-defined audience.

SUMMARY

In various embodiments of the invention, an online system defines a cluster group of users as audience for a content item provided by a third party system. The online system generates the cluster group by expanding a source-based seed group of users. The seed group includes users who visited webpages that are associated with the third party system and classified into a category associated with the content item. Through the expansion, the cluster group includes users who are not in the seed group but have similar characteristics with users of the seed group.

In one example, the online system generates a seed group based on messages received from client devices associated with users who visited the webpages associated with the third party system. Each message identifies a user and describes a webpage visited by the user. For example, the message includes an email address for identifying the user and describes an object associated with the webpage, e.g., an object made available for sale on the webpage. Based on the described object, the online system extracts a tag for the webpage. Further, the online system classifies the webpages into a category by using the extracted tag and a taxonomy indicating hierarchy between many tags. The category can include multiple webpages. The online system identifies users who visited the webpages of the category based on their email addresses and include these users into the seed group for the content item. The seed group defines custom audience for the content item.

Further, the online system expands the seed group to a cluster group by using a cluster model. The cluster model is trained by machine learning techniques to determine whether a candidate user (a user of the online system who is not in the seed group) should be included in the cluster group. The online system inputs one or more characteristics of the candidate user into the cluster model. The cluster model outputs a cluster score indicating a similarity of the candidate user to the users in the seed group. Based on the candidate user's cluster score at least equal to a cluster group cutoff score, the online system includes the candidate user in the cluster group. Accordingly, the cluster group is a larger group of users who share characteristics with the seed group.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
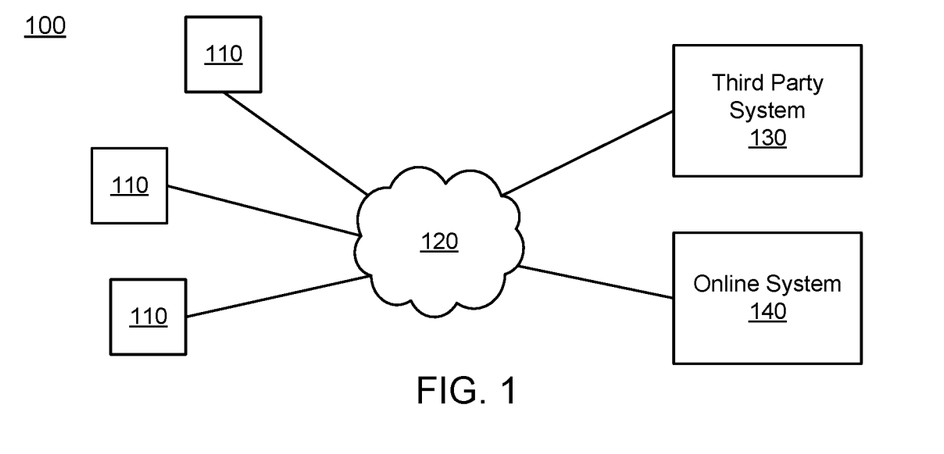
FIG. 1 is a block diagram of a system environment in which an online system operates, in accordance with an embodiment.

FIG. 1 is a block diagram of a system environment 100 in which an online system 140 operates, in accordance with an embodiment. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate with one or more third party systems 130 and the online system 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
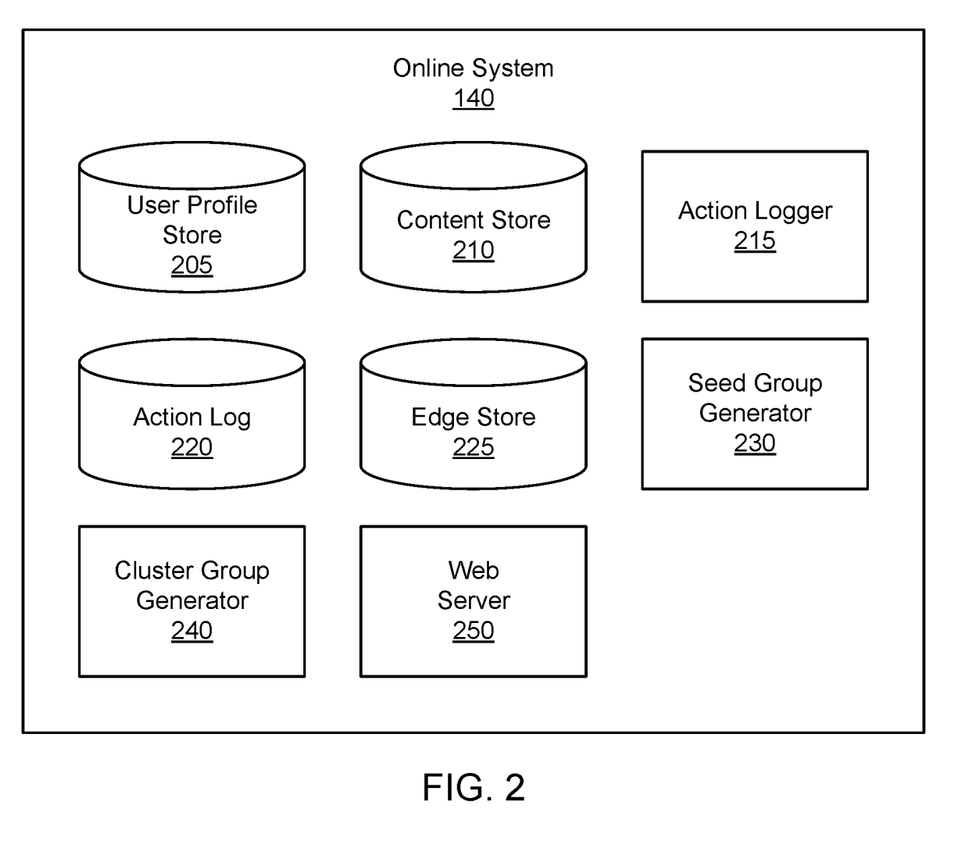
FIG. 2 is a block diagram of the online system in which a seed group generator and a cluster group generator operate, in accordance with an embodiment.

FIG. 2 is a block diagram of the online system 140 in which a seed group generator 230 and a cluster group generator 240 operate, in accordance with an embodiment. The online system 140 shown in FIG. 2 includes a user profile store 205, a content store 210, an action logger 215, an action log 220, an edge store 225, the seed group generator 230, the cluster group generator 240, and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220. A user profile may also include identification information of the user, including a user name, an email address, a physical address, a number, an image, or any combination thereof.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The content store 210 stores content items for presentation to a user. Content of a content item can be text, image, audio, video, or any other suitable data presented to a user. In various embodiments, the content of a content item also specifies a page of content. For example, a content item includes a landing page specifying a network address of a page of content to which a user is directed when the content item is accessed.

In some embodiments, a content item is associated with a bid amount. The bid amount is included in the content item by a user and is used to determine an expected value, such as monetary compensation, provided by an advertiser to the online system 140 if the content item is presented to a user, if the content item receives a user interaction when presented, or if any suitable condition is satisfied when the content item is presented to a user. For example, the bid amount included in a content item specifies a monetary amount that the online system 140 receives from a user who provided the content item to the online system 140 if the content item is displayed. In some embodiments, the expected value to the online system 140 of presenting the content item may be determined by multiplying the bid amount by a probability of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. The online system 140 logs interactions between users presented with the content item or with objects associated with the content item. Additionally, the online system 140 receives compensation from a user associated with a content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were interacted, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The seed group generator 230 generates a seed group of users that defines a custom audience for a content item for presentation to users of the online system 140. The seed group generator 230 receives messages from client devices 110 associated with users of the online system 140 who visited one or more webpages associated the provider of the content item, e.g., a third party system 130. Each message includes identification information associated with a user and descriptive information associated with a webpage visited by the user. Example identification information associated with a user includes a name, an email address, a physical address, a number, an image, or any combination thereof. Example descriptive information associated with a webpage includes a domain name, a uniform source locator (URL), a listed product or service, or any combination thereof. The seed group generator 230 extracts a tag for each webpage based on its descriptive information. For example, the seed group generator 230 extracts the tag by identifying a product indicated in the descriptive information. Further, the seed group generator 230 classifies the webpage into a category based on the extracted tag. The category can be determined based on a taxonomy indicating hierarchy between many tags. The seed group generator 230 identifies users who visited one or more webpages in the category based on the identification information in the received messages and includes these users into the seed group. More details about the seed group generator 230 are described in conjunction with FIG. 3.

The cluster group generator 240 performs a lookalike expansion process on the seed group to obtain a larger group of users who are similar to the users in the seed group. Embodiments of lookalike expansion in batch processes and in real-time are described in U.S. application Ser. No. 13/297,117, filed Nov. 15, 2011, and U.S. application Ser. No. 14/290,355, filed May 29, 2014, each of which is incorporated by reference in its entirety. The lookalike expansion may further be weighted according to the weights specified by the third party system 130 for each user in the custom audience group. This gives the third party system 130 greater ability to shape the resulting expanded audience by specifying which users are more representative of the desired audience. Embodiments of lookalike expansion process using weights are described in U.S. application Ser. No. 15/068,526, filed Mar. 11, 2016, which is incorporated by reference in its entirety. More details about the cluster group module 240 are described in conjunction with FIG. 4.

The web server 250 links the online system 140 via the network 120 to the one or more client devices 110, as well as to the one or more third party systems 130. The web server 250 serves web pages, as well as other content, such as JAVA®, FLASH®, XML and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as JOS®, ANDROID™, or BlackberryOS.

Expansion of Source-Based Custom Audience

Figure 3:
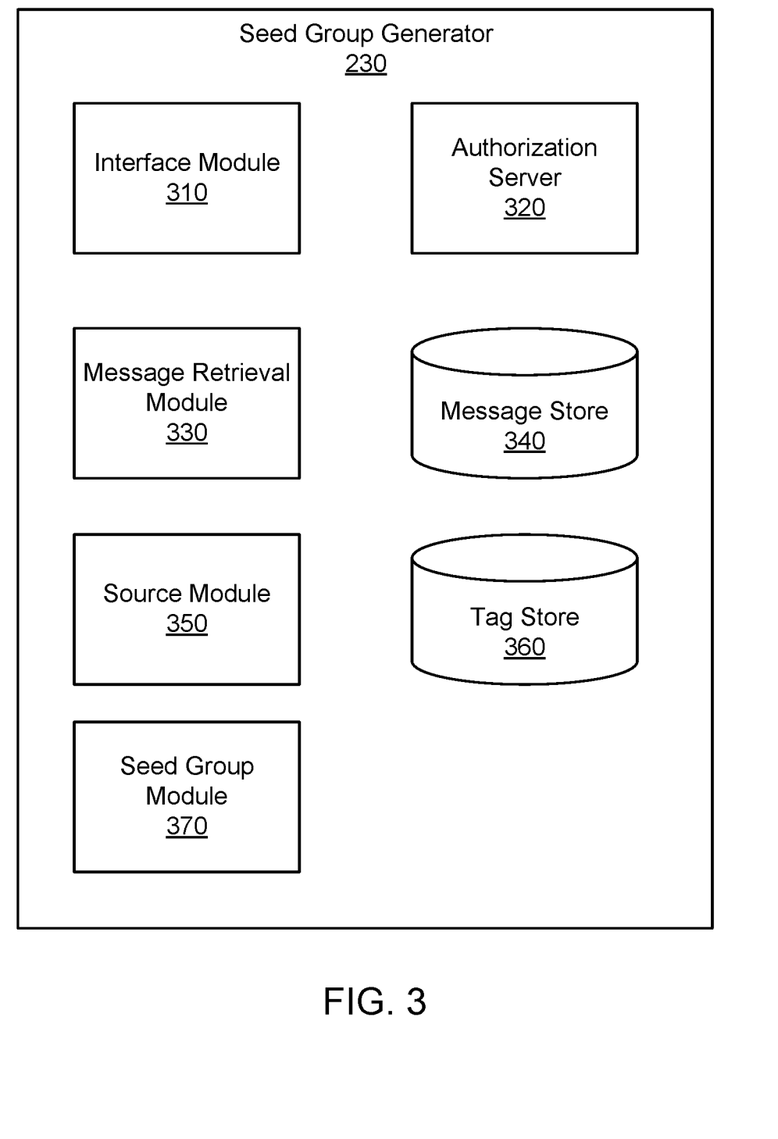
FIG. 3 is a block diagram of the seed group generator, in accordance with an embodiment.

FIG. 3 is a block diagram of the seed group generator 230, in accordance with an embodiment. The seed group generator 230 generates a source-based seed group that defines custom audience for a content time associated with a third party system 130. The seed group generator 230 in the embodiment of FIG. 3 includes an interface module 310, an authorization server 320, a message retrieval module 330, a message store 340, a source module 350, a tag store 360, and a seed group module 370. In other embodiments, the seed group generator 230 may include additional, fewer, or different components for various applications.

The interface module 310 facilitates communication of the seed group generator 230 with other entities. For example, the interface module 310 receives messages from client devices 110 associated with users who visited webpages associated with the third party system 130. Each message includes contextual information that identifies a user and describes a webpage visited by the user. The messages are stored at the message store 340. Additionally, the interface module 310 sends information associated with the users in the seed group (e.g., identification information, one or more characteristics, etc.) to the cluster group generator 240 for conducting the lookalike expansion.

The authorization server 320 enforces one or more privacy settings of the users of the online system 140. A privacy setting of a user determines how particular information associated with a user may be shared. In some embodiments, one or more privacy settings are stored in the user profile of a user in the user profile store 205 or are stored in the authorization server 320 and associated with a user profile. A privacy setting may specify whether the online system 140 maintains an association of the user with a one or more audience groups, allowing the user to opt out of advertisement targeting based on audience group membership; for example, the privacy setting allows a user to remove the user's identification information from the audience group and/or prevent the user's user identification information from being included in the audience group. In one embodiment, a privacy setting specifies particular information associated with a user and identifies the entity or entities with whom the specified information may be shared. Examples of entities with which information can be shared include other users, applications, third party systems 130 or any entity that can potentially access the information. Examples of information that may be shared by a user include user profile information (e.g., profile photo, phone numbers associated with the user, location, etc.), connections between the user and additional users, and actions taken by the user (e.g., adding a connection, changing user profile information).

The authorization server 320 includes logic to determine if certain information associated with a user may be accessed by users connected to the user, a third-party system 130 and/or other applications and entities. For example, a third-party system 130 that attempts to access a user's comment about a uniform resource locator (URL) associated with the third-party system 130 must get authorization from the authorization server 320 to access information associated with the user. Based on the user's privacy settings, the authorization server 320 determines if another user, a third-party system 130, an application, or another entity is allowed to access information associated with the user, including information about actions taken by the user. For example, the authorization server 320 uses a user's privacy setting to determine if the user's comment about a URL associated with the third-party system 130 may be presented to the third-party system 130 or may be presented to another user. This enables a user's privacy setting to specify which other entities or users are allowed to receive data about the user's actions or other data associated with the user.

The message retrieval module 330 facilitates retrieval of messages from client devices 110 associated with users who visited webpages associated with the third party system 130. A message includes identification information associated with a user and descriptive information associated with a webpage visited by the user. In one embodiment, the message retrieval module 330 provides an audience widget to one or more third party systems 130. For example, the audience widget is code or instructions for inclusion in content provided by the third party system 130 for execution by a client device 110 when received along with the content (e.g., a tracking pixel, JAVASCRIPT®, etc.). When the client device 110 executes the code or instructions comprising the audience widget, the client device 110 sends one or more messages to the seed group generator 230. In some embodiments, the audience widget may be created using a software development kit (SDK) provided to third party systems 130 by the online system 140. And in some instances, the online system 140 charges a third party system 130 a fee for using the SDK, allowing the online system 140 to receive additional compensation from the third party system 130.

For example, a third party system 130 includes the audience widget in one or more webpages provided by the third party system 130. When a client device 110 requests a webpage including the audience widget from the third party system, the audience widget communicates with the third party system 130, which sends a redirect request 110 to the client device 110. When the client device 110 receives the redirect request from the third party system 130, the client device 110 communicates the messages to the seed group generator 230.

In some embodiments, the identification information in a message corresponds to a user profile associated with the corresponding user by the online system 140. In some embodiments, the identification information is used by an application associated with the online system 140 and executing on the client device 110. Additionally, in some embodiments, the identification information may include a cookie that identifies the client device 110, or an application executing on the client device 110 used to access content, to the online system 140. The descriptive information in a message includes information defining the webpage (e.g., such as a URL or a domain name), information describing an object associated with the webpage (e.g., a product listed on the webpage), information introducing a theme of the webpage, etc.

In some embodiments, the audience widget may cause the third party system 130 to communicate one or more inclusion criteria along with the redirect request to the client device 110, which communicates the one or more inclusion criteria to the seed group generator 230 along with the messages. An inclusion criteria specifies criteria for generating one or more seed groups. In one embodiment, one or more inclusion criteria identify characteristics of users included in a seed group. For example, inclusion criteria associate one or more locations with a seed group, where users are included in a seed group based on a location of the user or based on a location associated with content with which the user interacts (e.g., a website for a hotel in Paris vs. a website for a hotel in London). Other examples of inclusion criteria include a user in a seed group based on types of actions performed by the user with webpages. In one embodiment, the message retrieval module 330 provides a user interface to the third party system 130 to specify one or more inclusion criteria and communicate the one or more inclusion criteria to the online system 140. A third party system 130 administrator may login to the online system 140 and create, edit, delete, or otherwise modify one or more inclusion criteria via the user interface. In other embodiments, the third party system 130 generates the one or more inclusion criteria and provides at least one of the generated inclusion criteria to the online system 140 using any suitable method.

The source module 350 classifies the webpages described in the received messages into one or more categories. For example, the source module 350 extracts a tag for a webpage based on its descriptive information. In some embodiments, the tag is determined based on a product associated with the webpage. For example, based on the message describing the webpage as an introduction of newly released basketball shoes, the source module 350 tags the webpage as athletic shoes.

Based on the extracted tag, the source module 350 classifies the webpage into a category. In some embodiments, the source module 350 generates a taxonomy indicating hierarchy including a multiple levels of tags and uses the taxonomy to classify the webpage. For example, the taxonomy includes three levels of tags: clothing is the first level, shoes is the second level, and athletic shoes is the third level. The source module 350 classifies the webpage into the clothing category. The clothing category can include webpages with tags other than athletic shoes, such as webpages tagged as hats, shirts, etc. The source module 350 may classify the webpage into more than one category, e.g., both the clothing category and the shoe category.

The taxonomy may be generated or provided by other entities, such as the third party system 130, and retrieved by the source module 350 for the classification. The taxonomy and extracted tags are stored in the tag store 360. More details regarding category classification by the source module 350 are described in conjunction with FIG. 5.

The seed group module 370 includes users who visited one or more webpages in a category associated with the content item to the seed group for the content item. The seed group module 370 can identify the users based on identification information in messages retrieved from the message store 340. In an example where the category associated with the content item is clothing, the seed group module 370 identifies users who visited webpages in the clothing category, which includes webpages tagged as athletic shoe, hats, shirts, etc. Users visited one or more of the webpages in the clothing category are included in the seed group for the content item.

In some embodiments, the seed group module 370 also retrieves one or more inclusion criteria and applies the retrieved inclusion criteria to further identify users to be included in the seed group. Additionally, one or more privacy settings associated with the user corresponding to the extracted user identification information are retrieved from the authorization server 320, and the seed group module 370 associates the user with one or more seed groups based on the privacy settings and the inclusion criteria.

Figure 4:
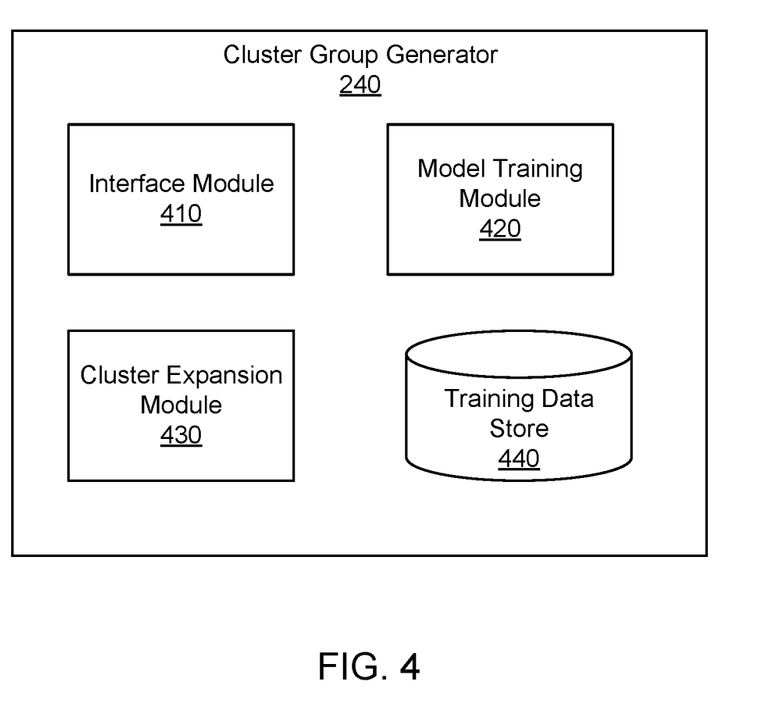
FIG. 4 is a block diagram of the cluster group generator, in accordance with an embodiment.

FIG. 4 is a block diagram of the cluster group generator 240, in accordance with an embodiment. As discussed above, the cluster group generator 240 performs a lookalike expansion on the seed group of users. The cluster group generator 240 in the embodiment of FIG. 4 includes an interface module 410, a model training module 420, a cluster expansion module 430, and a training data store 440. In other embodiments, the cluster group generator 240 may include additional, fewer, or different components for various applications.

The interface module 410 facilitates communication of the cluster group generator 240 with other entities. For example, the interface module 410 communicates with the seed group generator 230 to obtain identification information of the users in the seed group. The interface module 410 can also retrieve characteristics for the users in the seed group from the user profile store 205.

The model training module 420 trains a prediction model that outputs a score for a given candidate user, where the score indicates how well the candidate user fits the seed group. Methods of training prediction models used in lookalike expansion algorithms, both in batch processes and in real time, and using weights, are described above and in the patent applications incorporated by reference. In general, the model training module 420 extracts features that are relevant to the prediction model, which include features associated with a candidate user that describe characteristics of the user that are relevant to the determination for whether to include the candidate user in the expanded audience. The model training module 420 accesses training data from the training data store 440, which may include positive and negative examples for training the prediction model. The positive examples includes features of candidate users that should be included in the expanded group, and the negative examples includes features of candidate users that should not be included. The model training module 420 then trains the prediction model using the examples from the training data store 440. The trained prediction model outputs, for a given candidate user, how close the candidate user is to a weighted seed group of users, where the custom audience is used as the seed group. Various types of machine learning models may be used. Examples of training algorithms may include mini-batch-based stochastic gradient descent (SGD), gradient boosted decision trees (GBDT), SVM (support vector machine), neural networks, logistic regression, naïve Bayes, memory-based learning, random forests, decision trees, bagged trees, boosted trees, or boosted stumps The cluster expansion module 430 uses the trained prediction model to determine, for any given candidate user, whether to include the user in the expanded audience. For example, the cluster expansion module 430 evaluates a plurality of candidate users of the online system 130 that are not already in the customer audience group. For each candidate user, the cluster expansion module 430 applies the prediction module to obtain a score for the candidate user. The cluster expansion module 430 then determines whether the candidate user should be added to the expanded audience, such as by comparing the score to a fixed threshold or selecting a top percentile of candidate users' scores.

Figure 5:
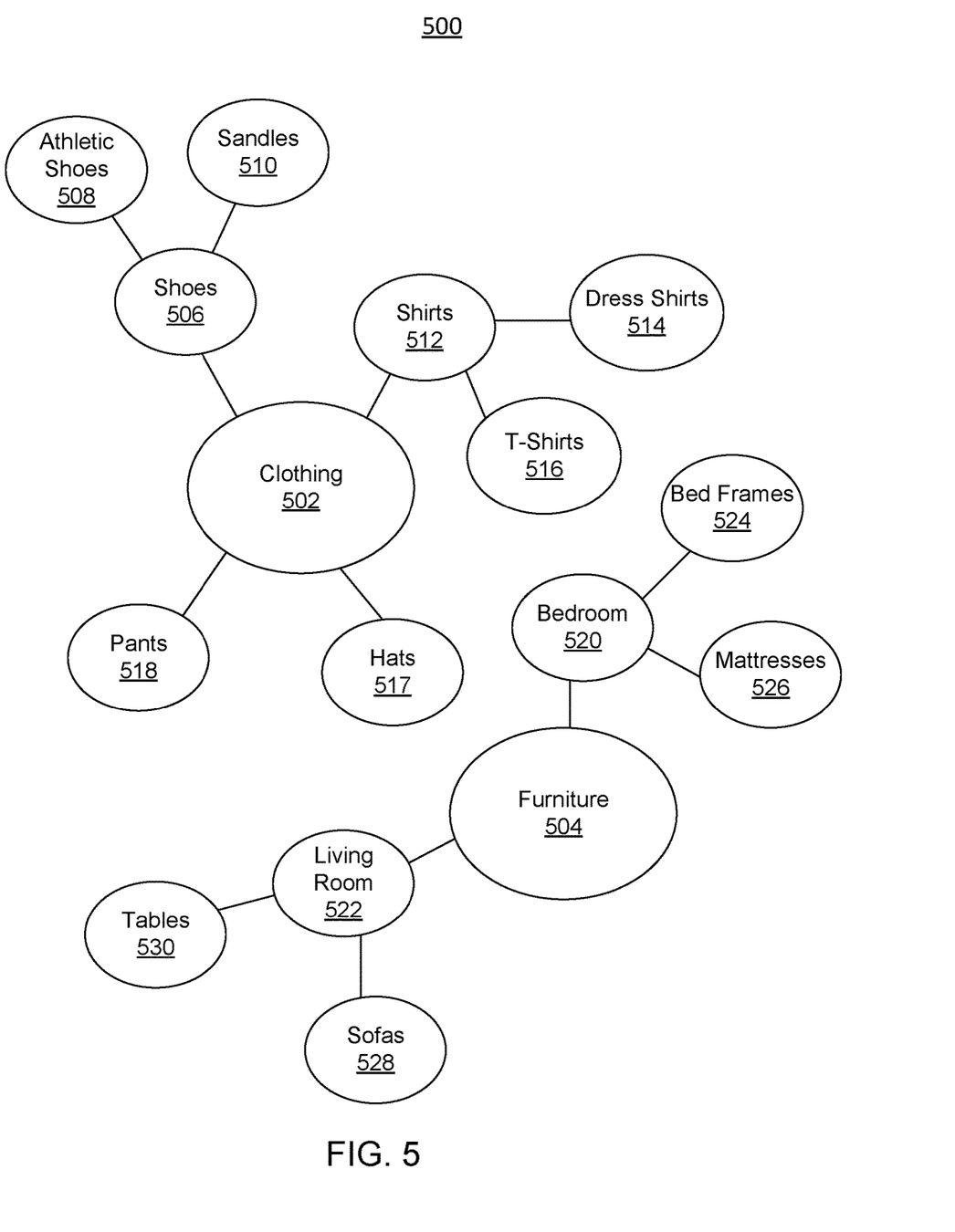
FIG. 5 is a diagram of a taxonomy of objects, in accordance with an embodiment.

FIG. 5 is a diagram of a taxonomy 500 of tags, in accordance with an embodiment. The taxonomy 500 may be generated by the source module 350 of the seed group generator 230 or other entities, e.g., the third party system 130. The taxonomy 500 is represented by a graph data structure that illustrates relationship between various tags. Each tag is represented by a node. The nodes are not necessarily connected to each other. The node for clothing 502 is connected to nodes for shoes 506, shirts 512, and pants 518. The node for shoes 506 is connected to the nodes for athletic shoes 508 and sandals 510. The node for shirts 512 is connected to the nodes for the dress shirts 514 and T-shirts 516. The node for furniture 504 is connected to the nodes for bedroom 520 and living room 522. The node for bedroom 520 is connected to the nodes for bed frames 524 and mattresses 526. The node for living room 522 is connected to the nodes for sofas 528 and tables 530.

Connection among the nodes in the taxonomy 500 indicates hierarchy between the tags. As shown in FIG. 5, the taxonomy has three levels of tags: the first level includes clothing 502 and furniture 504, the second level includes shoes 506, shirts 512, pants 518, hats 517, bedroom 520, and living room 522, and the third level includes athletic shoes 508, sandals 510, dress shirts 514, T-shirts 516, bed frames 524, mattress 526, tables 530, and sofas 528. The source module 350 can classify a tag to a category based on the taxonomy 500. For example, athletic shoes 508 is classified as clothing 502, while bed frames 524 is classified as furniture 504. A tag can be classified into more than one category. For example, athletic shoes 508 can be classified as shoes 506, in addition to clothing 502.

Figure 6:
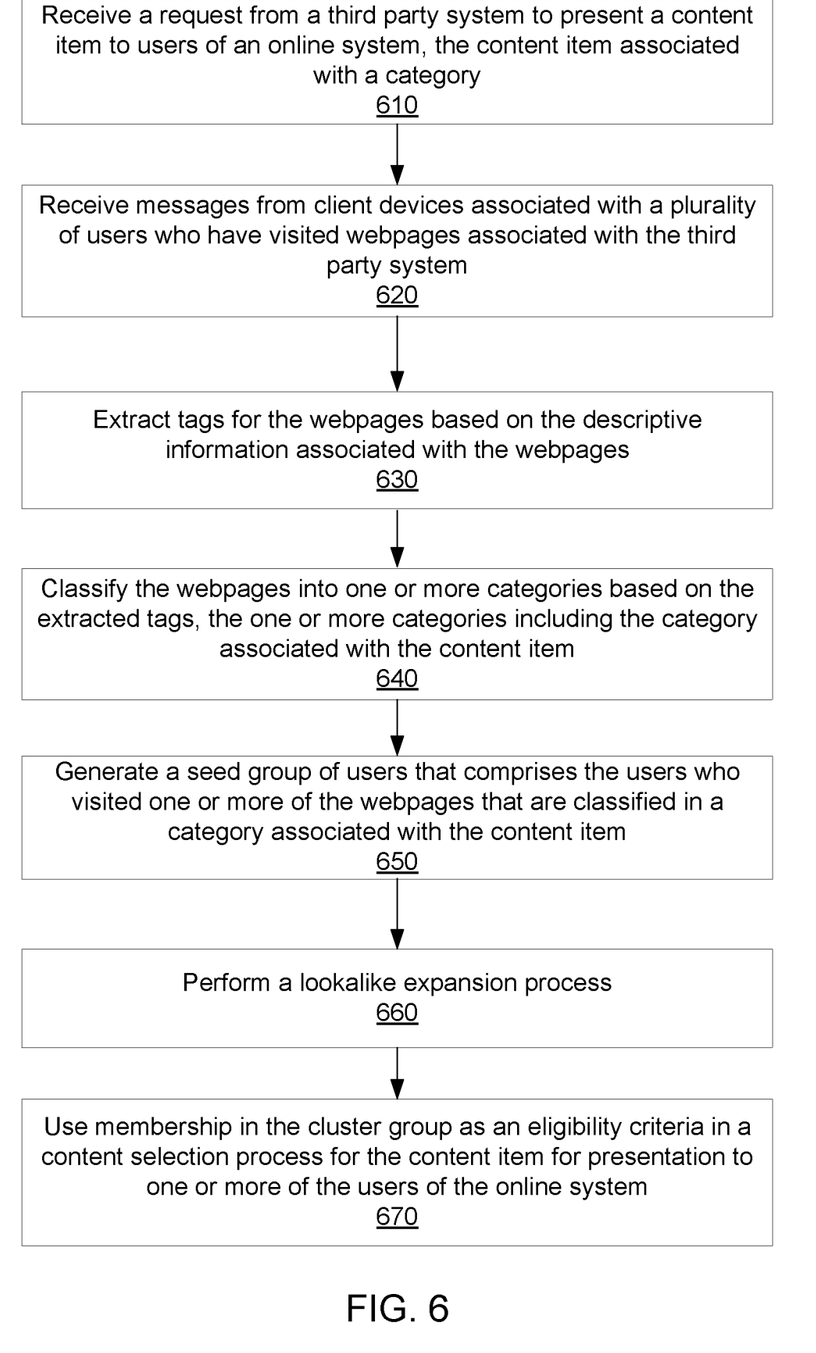
FIG. 6 is a flowchart illustrating a process of generating a cluster group by expanding a source-based seed group, in accordance with an embodiment.

FIG. 6 is a flowchart illustrating a process of generating a cluster group by expanding a source-based seed group, in accordance with an embodiment. In some embodiments, the process is performed by the online system 140, although some or all of the operations in the method may be performed by other entities in other embodiments. In some embodiments, the operations in the flow chart are performed in a different order and can include different and/or additional steps.

The online system 140 receives 610 a request from a third party system 130 to present a content item to users of the online system 140. The content item is associated with a category. Example of the category includes clothes, accessories, shoes, electronics, furniture, tools, musical instruments, etc.

The online system 140 receives 620 messages from client devices 110 associated with a plurality of users who have visited one or more webpages associated with the third party system 130. Each message includes identification information associated with a user and descriptive information associated with a webpage visited by the user.

The online system 140 extracts 630 tags for the webpages based on the descriptive information associated with the webpages. For example, the online system 140 identifies a product associated with a webpage from the descriptive information and determines a tag based on the product.

The online system 140 classifies 640 the webpages into one or more categories based on the extracted tags, the one or more categories including the category associated with the content item. In some embodiments, the online systems uses a taxonomy indicating a hierarchy between tags to determine a category for an extracted tag.

Further, the online system 140 generates 650 a seed group of users that comprises the users who visited one or more of the webpages that are classified in the category associated with the content item. The seed group defines source-based custom audience for the content item.

The online system 140 performs 660 a lookalike expansion process. The lookalike expansion process includes applying a cluster model to one or more characteristics of candidate users. A candidate user is a user of the online system who is not included in the seed group. The one or more characteristics of a candidate user includes hobbies or preferences, location, age, gender, educational background, work experience, historical actions of the user, connections associated with the user on the online system, or any combination thereof. Characteristics of candidate users can be maintained by the user profile store 205 of the online system 140. The cluster model is trained using machine learning technique to determine how well a candidate user fits the seed group. The cluster model receives an input of one or more characteristics of the candidate user and outputs a cluster score that indicates a similarity of the candidate user to the users of the seed group. The online system 140 determines whether to include a candidate user into the cluster group based on the cluster score. For example, the online system 140 compares the cluster score of a candidate user with a cluster group cutoff score. Based on the cluster score at least equal to the cluster group cutoff score, the candidate user is included into the cluster group. Accordingly, the cluster group is a larger group of users who have similar characteristics with the users in the seed group.

The online system 140 uses 670 membership in the cluster group as an eligibility criteria in a content selection process for the content item for presentation to one or more of the users of the online system. In some embodiments, the online system 140 provide the content item for presentation to all users in the cluster group. In some other embodiments, the online system 140 applies an inclusion criteria provided by the third party system 130 to select certain users in the cluster group as an audience of the content item.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving a request from a third party system to present a content item to users of an online system, the content item associated with a category;
receiving messages from client devices associated with a plurality of users who have visited webpages associated with the third party system, each message including identification information associated with a user and descriptive information associated with the webpage visited by the user;
extracting tags for the webpages based on the descriptive information associated with the webpages;
classifying the webpages into one or more categories based on the extracted tags, the one or more categories including the category associated with the content item;
generating a seed group of users for the category associated with the content item by including the users who visited one or more of the webpages that are classified in the category associated with the content item into the seed group for the category;
for each candidate user of a plurality of users of the online system who are not included in the seed group for the category, performing a cluster expansion process by:
applying a cluster model to one or more characteristics of the candidate user maintained by the online system, the cluster model outputting a cluster score for the candidate user, the cluster score indicating a similarity of the candidate user to the users of the seed group,
determining whether to include the candidate user in a cluster group for the category associated with the content item based on the candidate user's cluster score, and
including the candidate user in the cluster group based on the determination; and
using membership in the cluster group as an eligibility criteria in a content selection process for the content item for presentation to one or more of the users of the online system.

2. The method of claim 1, wherein extracting tags for the webpages based on the descriptive information associated with the webpages comprises:
for each webpage:
identifying a product associated with the webpage based on the descriptive information associated with the webpage, and
determining a tag for the webpage based on the identified product.

3. The method of claim 1, wherein classifying the webpages into one or more categories based on the extracted tags comprises:
obtaining a taxonomy indicating hierarchy between a plurality of tags, the hierarchy including multiple levels of tags; and
determining a category for each extracted tag based on the taxonomy.

4. The method of claim 1, wherein determining whether to include the candidate user in the cluster group for the category associated with the content item based on the candidate user's cluster score comprises:
comparing the candidate user's cluster score with a cluster group cutoff score; and
determining to include the candidate user in the cluster group based on the candidate user's cluster score at least equal to the cluster group cutoff score.

5. The method of claim 1, wherein the identification information associated with a user includes at least one of the following: a name associated with the user, an email address associated with the user, a physical address associated with the user, a number associated with the user, an image associated with the user, or any combination thereof.

6. The method of claim 1, wherein the descriptive information associated with a webpage visited by the user includes at least one of the following: a domain name associated with the webpage, a uniform source locator (URL) associated with the webpage, a product or service associated with the webpage, or any combination thereof.

7. The method of claim 1, wherein the one or more characteristics of a user include at least one of the following: hobbies or preferences, location, age, gender, educational background, work experience, historical actions of the user, connections associated with the user on the online system, or any combination thereof.

8. A non-transitory computer readable medium storing executable computer program instructions, the computer program instructions comprising instructions that when executed cause a computer processor to:
receive a request from a third party system to present a content item to users of an online system, the content item associated with a category;
receive messages from client devices associated with a plurality of users who have visited webpages associated with the third party system, each message including identification information associated with a user and descriptive information associated with the webpage visited by the user;
extract tags for the webpages based on the descriptive information associated with the webpages;
classify the webpages into one or more categories based on the extracted tags, the one or more categories including the category associated with the content item;
a seed group of users for the category associated with the content item, the seed group comprising the users who visited one or more of the webpages that are classified in the category associated with the content item;
for each candidate user of a plurality of users of the online system who are not included in the seed group for the category, perform a cluster expansion process by:
applying a cluster model to one or more characteristics of the candidate user maintained by the online system, the cluster model outputting a cluster score for the candidate user, the cluster score indicating a similarity of the candidate user to the users of the seed group,
determining whether to include the candidate user in a cluster group for the category associated with the content item based on the candidate user's cluster score, and
including the candidate user in the cluster group based on the determination; and
use membership in the cluster group as an eligibility criteria in a content selection process for the content item for presentation to one or more of the users of the online system.

9. The computer readable medium of claim 8, wherein the computer program instructions for extracting tags for the webpages based on the descriptive information associated with the webpages comprise instructions that when executed cause the computer processor to:
for each webpage:
identify a product associated with the webpage based on the descriptive information associated with the webpage, and
determine a tag for the webpage based on the identified product.

10. The computer readable medium of claim 8, wherein the computer program instructions for classifying the webpages into one or more categories based on the extracted tags comprise instructions that when executed cause the computer processor to:
obtain a taxonomy indicating hierarchy between a plurality of tags, the hierarchy including multiple levels of tags; and
determine a category for each extracted tag based on the taxonomy.

11. The computer readable medium of claim 8, wherein the computer program instructions for determining whether to include the candidate user in the cluster group for the category associated with the content item based on the candidate user's cluster score further comprise instructions that when executed cause the computer processor to:
compare the candidate user's cluster score with a cluster group cutoff score; and
determine to include the candidate user in the cluster group based on the candidate user's cluster score at least equal to the cluster group cutoff score.

12. The computer readable medium of claim 8, wherein the identification information associated with a user includes at least one of the following: a name associated with the user, an email address associated with the user, a physical address associated with the user, a number associated with the user, an image associated with the user, or any combination thereof.

13. The computer readable medium of claim 8, wherein the descriptive information associated with a webpage visited by the user includes at least one of the following: a domain name associated with the webpage, a uniform source locator (URL) associated with the webpage, a product or service associated with the webpage, or any combination thereof.

14. The computer readable medium of claim 8, wherein the one or more characteristics of a user include at least one of the following: hobbies or preferences, location, age, gender, educational background, work experience, historical actions of the user, connections associated with the user on the online system, or any combination thereof.

15. A computer system comprising:
a non-transitory computer-readable storage medium storing executable computer program instructions, the computer program instructions comprising instructions that when executed cause a computer processor to perform steps, comprising:
receiving a request from a third party system to present a content item to users of an online system, the content item associated with a category;
receiving messages from client devices associated with a plurality of users who have visited webpages associated with the third party system, each message including identification information associated with a user and descriptive information associated with the webpage visited by the user;
extracting tags for the webpages based on the descriptive information associated with the webpages;
classifying the webpages into one or more categories based on the extracted tags, the one or more categories including the category associated with the content item;
generating a seed group of users for the category associated with the content item, the seed group comprising the users who visited one or more of the webpages that are classified in the category associated with the content item;
for each candidate user of a plurality of users of the online system who are not included in the seed group for the category, performing a cluster expansion process by:
applying a cluster model to one or more characteristics of the candidate user maintained by the online system, the cluster model outputting a cluster score for the candidate user, the cluster score indicating a similarity of the candidate user to the users of the seed group,
determining whether to include the candidate user in a cluster group for the category associated with the content item based on the candidate user's cluster score, and
including the candidate user in the cluster group based on the determination; and
using membership in the cluster group as an eligibility criteria in a content selection process for the content item for presentation to one or more of the users of the online system.

16. The system of claim 15, wherein extracting tags for the webpages based on the descriptive information associated with the webpages comprises:
for each webpage:
identifying a product associated with the webpage based on the descriptive information associated with the webpage, and
determining a tag for the webpage based on the identified product.

17. The system of claim 15, wherein classifying the webpages into one or more categories based on the extracted tags comprises:
obtaining a taxonomy indicating hierarchy between a plurality of tags, the hierarchy including multiple levels of tags; and
determining a category for each extracted tag based on the taxonomy.

18. The system of claim 15, wherein determining whether to include the candidate user in the cluster group for the category associated with the content item based on the candidate user's cluster score comprises:
comparing the candidate user's cluster score with a cluster group cutoff score; and
determining to include the candidate user in the cluster group based on the candidate user's cluster score at least equal to the cluster group cutoff score.

19. The system of claim 15, wherein the identification information associated with a user includes at least one of the following: a name associated with the user, an email address associated with the user, a physical address associated with the user, a number associated with the user, an image associated with the user, or any combination thereof.

20. The system of claim 15, wherein the descriptive information associated with a webpage visited by the user includes at least one of the following: a domain name associated with the webpage, a uniform source locator (URL) associated with the webpage, a product or service associated with the webpage, or any combination thereof.

* * * * *